United States Patent

Nguyen et al.

[11] Patent Number: 5,926,394
[45] Date of Patent: Jul. 20, 1999

[54] METHOD AND APPARATUS FOR REGULATING THE VOLTAGE SUPPLIED TO AN INTEGRATED CIRCUIT

[75] Inventors: Don J. Nguyen; James L. Noble, both of Portland, Oreg.

[73] Assignee: Intel Corporation, Santa Clara, Calif.

[21] Appl. No.: 08/724,173

[22] Filed: Sep. 30, 1996

[51] Int. Cl.[6] .................................................. G06F 17/00
[52] U.S. Cl. .......................................... 364/489; 364/488
[58] Field of Search ..................................... 364/488, 489, 364/490; 323/271, 280; 327/112, 250, 264

[56] References Cited

U.S. PATENT DOCUMENTS

| | | | |
|---|---|---|---|
| 5,179,508 | 1/1993 | Lange et al. | 363/16 |
| 5,309,461 | 5/1994 | Call et al. | 372/38 |
| 5,394,076 | 2/1995 | Huykman | 323/222 |

OTHER PUBLICATIONS

M. Morris Mano "Digital Design," By Prentice–Hall, Inc, Englewood Cliffs, New Jersey 07673, pp. 324–425, 1984.

*Primary Examiner*—Kevin J. Teska
*Assistant Examiner*—Vuthe Siek
*Attorney, Agent, or Firm*—David J. Kaplan

[57] ABSTRACT

A method and apparatus for regulating a voltage supplied by a power supply to an integrated circuit. A signal is sent to the power supply. This signal signifies that a change in the current drawn by the integrated circuit from the power supply will occur. Next, the voltage supplied by the power supply to the integrated circuit is adjusted in response to this signal before the change in current occurs. The adjustment is in a direction that will compensate for the anticipated voltage transient that will result from the change in the current.

14 Claims, 3 Drawing Sheets

METHOD AND APPARATUS FOR REGULATING THE VOLTAGE SUPPLIED TO AN INTEGRATED CIRCUIT

FIELD OF THE INVENTION

The present invention relates to regulating the voltage supplied to an integrated circuit and more particularly to reducing transient voltage range resulting from current surges through a processor of a computer system.

BACKGROUND OF THE INVENTION

Because of the highly mobile nature of today's business person, mobile computers are becoming increasingly popular. Mobile computers include, for example, notebook, personal data assistants (PDA's), laptop, and other portable computers. Because the primary function of these electronic devices is to enable the user to execute computationally intensive instructions, such as those required by personal computer software applications, more powerful mobile computers are constantly being developed to keep pace with more demanding software. One highly saleable feature of mobile computers is the length of time the computer can operate between battery charges. Between two mobile computer systems of approximately equal performance, the computer system that is able to operate for a longer period of time between battery charges is considered much more desirable to an end user. Unfortunately, as mobile computing power increases, so increases the drain on the battery. As an example, consider the processor of a typical mobile computer. The processor is commonly considered to be the "brains" of any computer system, and more powerful processors of more powerful computer systems tend to require more electric power to function. Because a processor constitutes one the most significant drains on the battery of a mobile computer, a more powerful computer that includes a more powerful processor tends to drain a battery more quickly than does a less powerful computer, thereby reducing the operational time of the computer system between battery charges.

One method of reducing the amount of electric power drawn by a processor is to design the processor such that it is capable of functioning in two different modes. In a first mode of operation, only the most vital functions of the processor such as, for example, those portions dedicated to monitoring computer system status and user input are functioning. This is referred to as the sleep mode, and it is during this mode that the processor draws very little power from the power supply. In a second mode of operation, the processor is busy executing instructions issued to the processor by the user via a software interface, performing memory management, and other input/output functions. This is referred to as the wake mode, and it is during this mode that the processor consumes a significant amount of power from the power supply.

FIG. 1 is a timing diagram that shows the relationship between signals coupled to processor 10. The signal at the mode signal line coupled to processor 10 switches between a first voltage level, indicating a sleep mode, and a second voltage level indicating a wake mode. When the mode signal switches from the sleep to wake mode (or state), this signifies that the processor is to switch from its sleep to wake mode. The difference in power consumed by processor 10 in these two different modes of operation is indicated by the change in current, I, drawn by processor 10 when switching between the sleep and wake modes.

As shown in FIG. 1, soon after the mode signal signifies that the processor is to switch from a sleep mode to a wake mode, the current drawn by the processor changes from a low current to a high current. Drawing this high current from the power supply indicates that much of the internal circuitry of the processor, which was previously inactive, becomes active, and the processor, along with the entire computer system, is said to have entered its wake mode of operation.

Similarly when the mode signal switches from wake to sleep, this signifies that the processor is to enter into its sleep mode. Once the processor executes the appropriate routines to enable it to shut down portions of its internal circuitry, the power drawn by the processor from the power supply changes from a high current to a low current. At this point the processor, along with the entire computer system, is said to have entered the sleep mode.

By designing a processor to operate in sleep and wake modes, power is conserved because unneeded portions of the processor are shut down when not in use, thereby reducing the overall power consumed by the processor. Unfortunately, there is a side effect associated with switching a processor between sleep and wake modes. The rapid changes in current drawn from a power supply by the processor when the processor switches between modes causes fluctuations in the voltage supplied to the processor by the power supply.

For example, in FIG. 1 it can be seen that while the processor is in sleep mode, the voltage, V, supplied to the processor by the power supply, is at a nominal, constant level during period of time 11. Once the processor switches into the wake mode, however, the current, I, supplied to the processor by the power supply, changes from a low to high value in a relatively short period of time, thereby causing a downwardly spiking voltage supply transient 12. The power supply eventually recovers from the current surge through the processor, and the voltage settles back up to a relatively constant value while the processor is in wake mode during period of time 13.

During the period of time 13, the voltage is typically slightly lower than the nominal voltage level supplied during time 11. This is due to the inability of the power supply to sufficiently drive the high current to processor 10 while the processor is in the wake mode. When the processor then switches back to the sleep mode from the wake mode, causing the current, I, to change from a high to a low value in a relatively short period of time, an upwardly spiking voltage transient 14 occurs. The power supply again recovers from the rapid change in current, lowering the voltage V supplied to processor 10 back to its original nominal level during period of time 15.

The transient range of voltage V is the difference between the peak voltage reached during transient 14 and the minimum voltage reached during transient 12. Typically, processors have specified transient ranges within which the processor is qualified to operate. Outside of this transient range however, a processor is no longer guaranteed to operate properly. As the nominal supply voltage levels for more highly advanced processors decreases, the transient range tolerance of those processors becomes much tighter. Therefore, to provide for reliable operation of advanced computer systems, it becomes necessary to better regulate the voltage supplied by a power supply to a processor such that the transient voltage range is reduced.

SUMMARY OF THE INVENTION

A method and apparatus for regulating a voltage supplied by a power supply to an integrated circuit is described. A signal is sent to the power supply. This signal signifies that a change in the current drawn by the integrated circuit from the power supply will occur. Next, the voltage supplied by the power supply to the integrated circuit is adjusted in response to this signal before the change in current occurs. The adjustment is in a direction that will compensate for the anticipated voltage transient that will result from the change in the current.

Other features of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A method and apparatus is described for regulating the voltage supply to a processor or other integrated circuit in a computer system, such that the transient voltage range is reduced. In accordance with one embodiment of the present invention, a power supply is coupled to and supplies a relatively constant voltage to the processor of a computer system. The computer system is designed in a manner such that a signal is sent to the power supply that signifies when the processor is about to enter a wake or sleep mode of operation. Responsive to this signal, the power supply adjusts the voltage supplied to the processor in a direction which will compensate for the anticipated voltage transient that will result from the processor switching between modes.

For example, it is known that when a processor switches from a sleep mode to a wake mode, the associated rapid change from low to high current causes a downward spiking voltage transient from the power supply to the processor. Therefore, when a signal indicates that the processor is about to switch from a sleep to a wake mode, the power supply slightly increases the voltage to the processor to offset the oncoming downward-spiking voltage transient. Similarly, when a signal is generated that signifies that the processor is about to switch from the wake mode to the sleep mode, the power supply slightly decreases the voltage supplied to the processor to offset the anticipated upwardly spiking voltage transient resulting from the rapid high to low current change.

Compensating for anticipated voltage transients by slightly offsetting the voltages supplied to the processor in the appropriate direction before the processor switches modes has the effect of reducing the voltage transient range supplied by the power supply to the processor. Thus, system reliability is improved by this tighter regulation of voltage supplied to the processor. The power supply and methods for offsetting the voltage transients will be described in more detail below, along with timing diagrams, to provide a more thorough description of how to implement an embodiment of the present invention. Various other configurations and implementations in accordance with alternate embodiments of the present invention are also described in more detail below.

Figure 1:
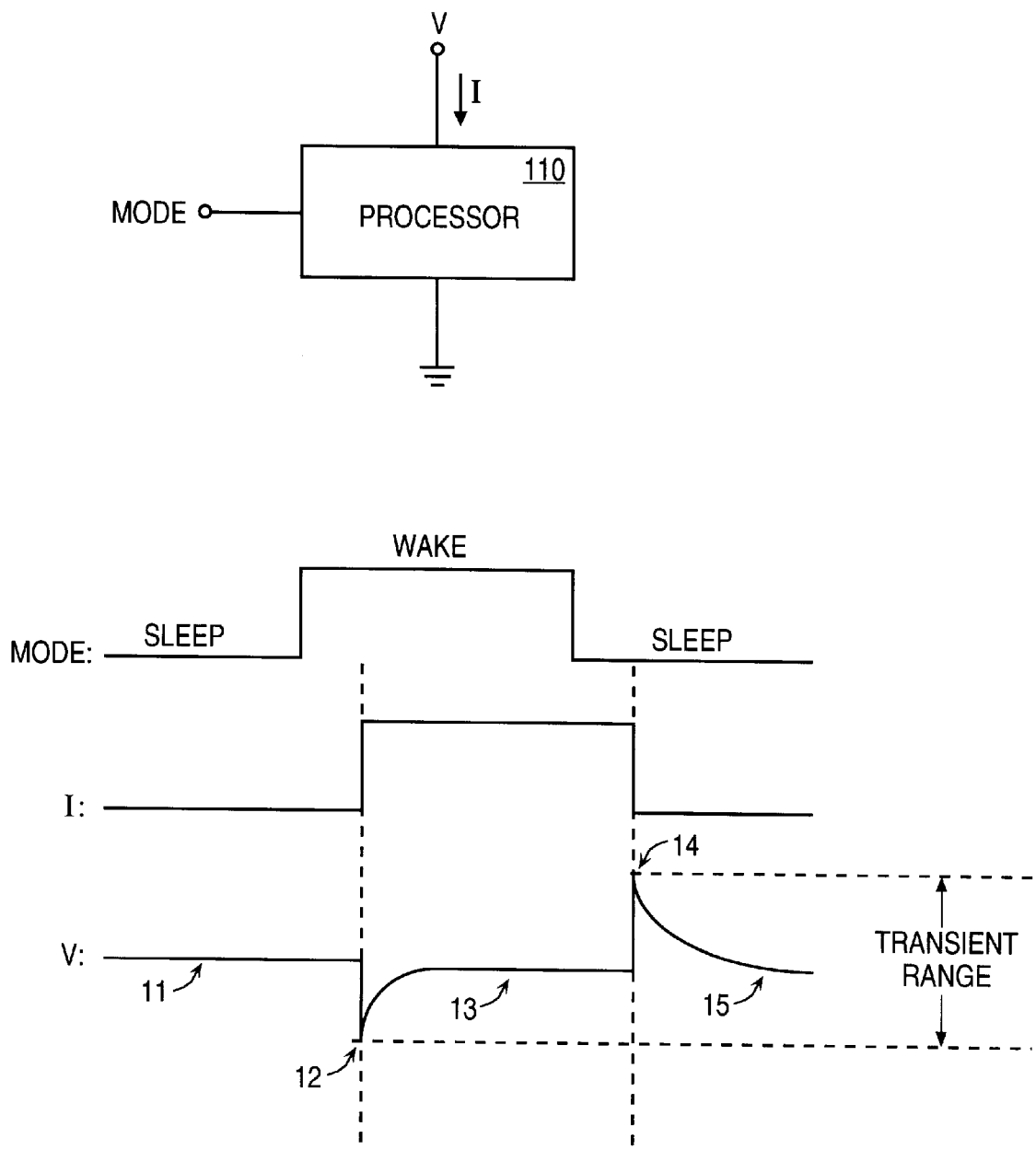
FIG. 1 is a timing diagram showing the relationship between a mode signal, the current drawn by a processor, and the voltage supplied to the processor in the prior art.
Figure 2:
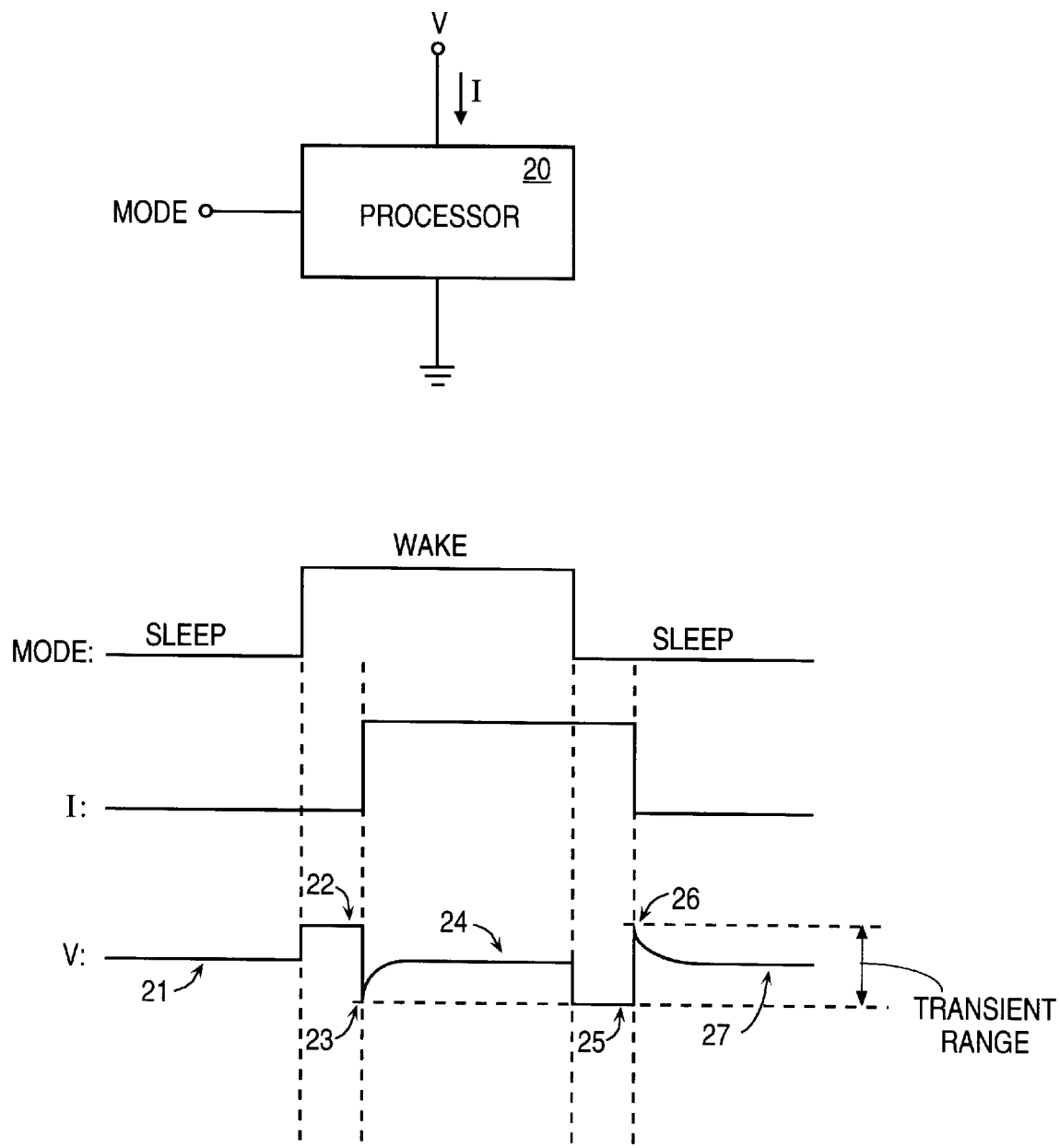
FIG. 2 is a timing diagram showing the relationship between a mode signal, the current drawn by a processor, and the voltage supplied to the processor in accordance with one embodiment of the present invention.

FIG. 2 is a timing diagram that shows the relationship between a mode signal, the current drawn by the computer's processor 20, and the voltage supplied to the processor in accordance with one embodiment of the present invention. A power supply supplies current, I, and voltage, V, to processor 20. The mode signal line coupled to processor 20 carries a signal that signifies an upcoming switch between the sleep and wake modes of processor 20.

For one embodiment of the present invention, the mode signal is an input signal to the processor and is sent by a subsystem of the computer wherein the subsystem measures the time transpired since the computer user's last keystroke or cursor movement. If the time transpired is greater than a predetermined amount, the subsystem sends a mode signal to the processor signifying that the processor is to switch from wake to sleep mode. This embodiment may be found useful in mobile computer systems to conserve battery power by placing the system into low power sleep mode soon after the user walks away from the computer. Alternatively, the processor itself works in conjunction with the subsystem to measure the time transpired between user keystrokes, switches itself from wake to sleep mode when appropriate, and sends the mode signal as an output soon before the switch occurs. Once in sleep mode, the processor and subsystem then continue to monitor the keyboard and mouse for user input. When input is detected, the mode signal is sent signifying that the processor will switch from the sleep to wake mode. Soon after sending this signal, the processor switches from the sleep to wake mode.

For another embodiment of the present invention the mode signal is generated in response to the user activating either a hardware or software switch. For example, for this embodiment the computer system user may use the mouse, keypad, trackball, trackpad, or other cursor control device to request that the computer system, and more particularly, the processor of the computer system, switch from the wake to sleep mode. In accordance with alternate embodiments of the present invention, the mode signal is sent by a subsystem of the computer system or by the processor itself in response to factors such as, for example, low battery power detection, device overheating, or docking station detection.

As shown in FIG. 2, while the processor is in the sleep mode, the current I drawn by the processor from the power supply is low. The voltage V supplied to the processor by the power supply is at its nominal value during the period of time 21. For older processors, this nominal voltage supply level is typically five volts. In more advanced processors, however, particularly those suited for low power mobile computer systems, this nominal voltage supply level typically ranges from 3.3 volts to 2.9 volts. For future technologies, more advanced processors are expected to be supplied at even lower voltage levels.

Note that what is referred to herein as the sleep mode, is also commonly referred to as inactive, power-down, deep power-down, deep sleep, low-power, and idle modes. This not the same as a power-off mode in which the computer system is entirely switched off and no power is supplied to the processor. During the sleep mode, power is still supplied and used by the computer system, however, the processor is not executing instructions at its maximum potential. Rather, the processor is executing basic processes such as monitoring the computer system for requests from the user or peripheral devices to retrieve, store, or calculate data. During the sleep mode of operation, the processor consumes comparatively little power from the power supply because many of the processor's internal, power-hungry units are either slowed down or entirely shut off.

The mode signal then signifies that the processor will soon switch to the wake mode. As described above, this mode signal may be generated by a subsystem of the computer system instructing the processor to switch modes, or it may be generated by the processor itself, indicating to the rest of the system that the processor is about to switch modes. Before the processor switches from the sleep to wake mode and begins to draw a higher current from the power supply, the voltage supplied to the processor by the power supply is raised slightly during period of time 22.

Referring back to FIG. 2, when the processor subsequently switches into the wake mode, as indicated by the current, I, drawn by the processor from the power supply changing from a low to a high current, the downward spiking voltage transient 23 occurs. Because the voltage supply level has been slightly increased during period of time 22, however, the minimum voltage reached at the downward peak of voltage transient 23 is not as low as it otherwise would have been had the voltage not been slightly offset during period of time 22 to compensate for the voltage transient. As a result, the lower-bound on the transient range of the voltage supply V is raised thereby tightening or reducing the transient range. After voltage transient 23 occurs, the power supply recovers from the rapid change in current and the voltage level settles back to the nominal value during the period of time 24.

When the mode signal signifies that another change in processor mode will occur, the voltage supplied by the power supply to the processor is again slightly adjusted to compensate for the anticipated voltage transient in the opposite direction during period of time 25. The processor then switches to the sleep mode as indicated by the current I drawn by the processor changing from a high to low value. Concurrently, upwardly spiking voltage transient peak 26 occurs. Because the voltage level was slightly offset, however, before the occurrence of voltage transient 26, the voltage reached at the peak of the transient is not as high as it otherwise would have been had the voltage level not been initially adjusted in the opposite direction to compensate for the transient. Eventually the power supply will recover from the rapid change in current drawn by the processor and the voltage supplied by the power supply will settle back down to the nominal value during period of time 27.

The amount the voltage V supplied to the processor is adjusted during periods of time 22 and 25 to compensate for the subsequent voltage transient peaks 23 and 26 respectively, depends primarily upon the magnitude of the voltage transient. For one embodiment, the voltage supplied to the processor by the power supply is offset at one half the magnitude of the anticipated voltage transient in the opposite direction. Another consideration for the amount that the voltage supplied to the processor by the power supply should be offset is the desirability for the voltage level during the wake mode of the processor to settle at the nominal value specified by the processor.

As an example, for one embodiment of the present invention, a processor specifies a nominal supply voltage as 2.9 V with a transient range tolerance of 150 mV. It is known that the power supply coupled to the processor causes voltage transients to occur having a magnitude of 100 mV whenever the processor causes a rapid change in current drawn from the power supply due to switching between sleep and wake modes. In addition, it is known that during the wake mode, the voltage supplied to the processor by the power supply drops 50 mV below the nominal voltage supply value. Without adjusting the voltage supply levels to compensate for the voltage transients, the power supply will permit a voltage transient range of 200 mV from 2.8 volts to 3.0 volts, which is outside the range specified by the processor. The voltage supplied to the processor during the wake mode will be 50 mV below the nominal value of 2.9 volts, or 2.85 volts. In accordance with one embodiment of the present invention, the voltage supply value is raised by 50 mV before the processor transitions from the sleep to wake mode, and is again lowered by 50 mV before the processor transitions back to the sleep mode. In this manner, the voltage transient range is reduced to 100 mV, well within the value specified by the processor, and the power supply will supply the nominal value of 2.9 volts to the processor during the wake mode.

In accordance with one embodiment of the present invention, the difference between the high and low currents drawn by the processor from the power supply during the wake and sleep modes, respectively, is at least one order of magnitude (power of ten). For example, for one embodiment, the processor draws 100 mA of current from the power supply during the sleep mode and upwards of 1 A of current during its wake mode. For another embodiment of the present invention, the difference between the current drawn by the processor from the power supply during the wake and sleep modes is two or more orders of magnitude.

Figure 3:
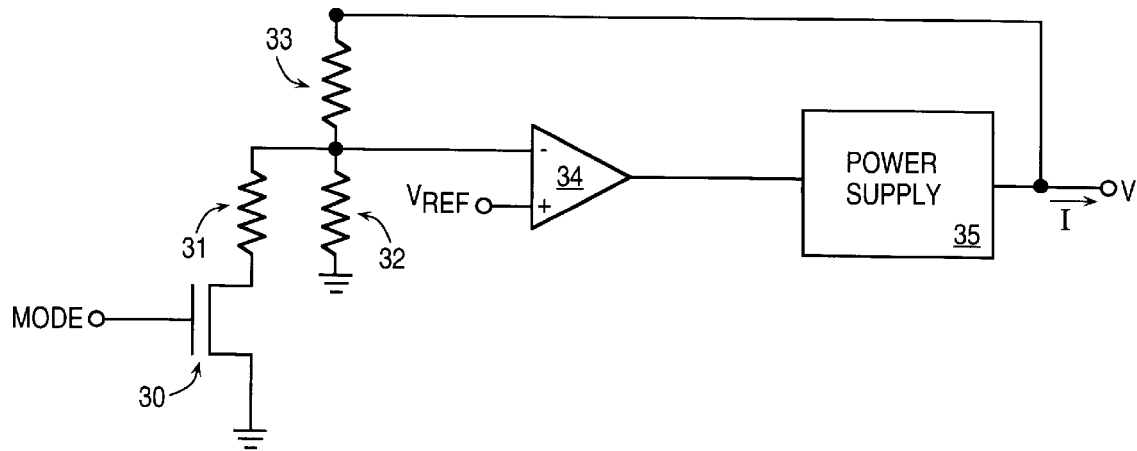
FIG. 3 is a circuit that supplies power to a processor in accordance with one embodiment of the present invention.

FIG. 3 is a circuit that supplies power, including voltage V and current I, to the processor of FIG. 2. In accordance with an embodiment of the present invention, the mode signal is coupled to the gate of an n-channel transistor 30. The source of transistor 30 is coupled to ground while its drain is coupled to one end of resistor 31. The opposite end of resistor 31 is coupled to the inverting input of comparator 34. The non-inverting input to comparator 34 is coupled to a constant reference voltage $V_{ref}$. The output of comparator 34 is coupled to an input of power supply 35. The output of power supply 35 is fed back to the inverting input of comparator 34 through resistor 33. The inverting input to comparator 34 is coupled to ground through resistor 32.

When inverting input to comparator 34 falls below the reference voltage $V_{ref}$, the output of comparator 34 sends a signal to power supply 35 to increase the voltage V at its output. Conversely, when the inverting input to comparator 34 is raised above the voltage value $V_{ref}$, comparator 34 sends a signal to power supply 35 to reduce the voltage V at its output. In this manner, the voltage V supplied by the power supply to the processor is regulated and held at a relatively constant value. Note that in the interest of clarity, power supply 35 is merely represented in block form. The boundaries of power supply block 35 have been arbitrarily selected in the manner shown to highlight the relationship between the mode signal and its effect on voltage V. The power supply of the computer system may alternatively be defined to include any of components 30 through 34. For this reason it is understood that sending the mode signal to the gate of transistor 30 is equivalent to stating that the mode signal is simply sent to the power supply itself or an input of the power supply.

In accordance with one embodiment of the present invention, when the processor is in the sleep mode, the voltage applied to the gate of n-channel transistor 30 is low, turning off the transistor. Power supply 35 supplies the nominal voltage V to the processor and resistors 33 and 32 act as a voltage divider to provide a voltage approximately equal to $V_{ref}$ to the inverting input of comparator 34. Comparator 34 works with power supply 35 within this feedback system to regulate the output voltage V to the proper nominal value.

When the mode signal, applied to the gate of transistor 30, switches to a high value, the n-channel transistor 30 turns on, thereby grounding the lower end of resistor 31 which effectively pulls down the voltage fed back into the inverting input of comparator 34. Lowering the voltage to the inverting input of the comparator causes comparator 34 to believe that power supply 35 has lowered its output voltage V and subsequently sends a signal to power supply 35 to increase its output voltage. As a result, a slight voltage adjustment is made by the power supply to offset the voltage V supplied to the processor in anticipation of the upcoming rapid change in current caused by switching from the sleep to wake mode. Offsetting the voltage corresponds to period of time 22 shown in FIG. 2. Resistors 31, 32, and 33 are selected such that the proper adjustment that will compensate for the anticipated voltage transient is achieved as described above. For example, to achieve the 50 mV adjustment in the example given above, resistor 31 is 290 KW, resistors 32 and 33 are 10 KW, voltage V is 2.9 volts, and voltage $V_{ref}$ is 1.45 volts.

When the mode signal subsequently goes low and is applied to the gate of transistor 30, the transistor is turned off, thereby isolating resistor 31 and eliminating its pull-down effect at the inverting input of comparator 34. As a result, comparator 34 will cause power supply 35 to reduce the voltage V at its output back to the nominal value (minus the offset due to inherent limitations in driving the high current drawn by the processor during its wake mode, as described above). This corresponds to period of time 25 shown in FIG. 2. The processor subsequently switches from the wake to sleep mode, causing a temporary voltage transient but ultimately allowing the voltage supplied by the power supply to the processor to settle back to its nominal value.

Figure 4A:
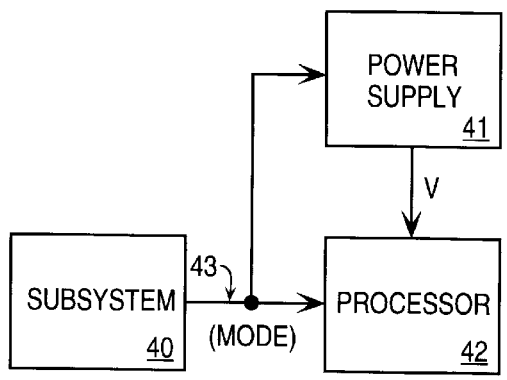
FIG. 4A is a block diagram showing one configuration of a computer system designed in accordance with an embodiment of the present invention.

FIG. 4A is a block diagram showing one configuration of a computer system designed in accordance with an embodiment of the present invention. For this embodiment, subsystem 40 of the computer system sends a mode signal to processor 42 across signal line 43, indicating to the processor to switch modes. Power supply 41 intercepts signal line 43 and adjusts the voltage V supplied to processor 42 in response to the signal before the processor switches modes to compensate for the anticipated voltage transient that will occur. In accordance with one embodiment of the present invention, a subsystem is a collection of circuit elements integrated to perform a function.

Figure 4B:
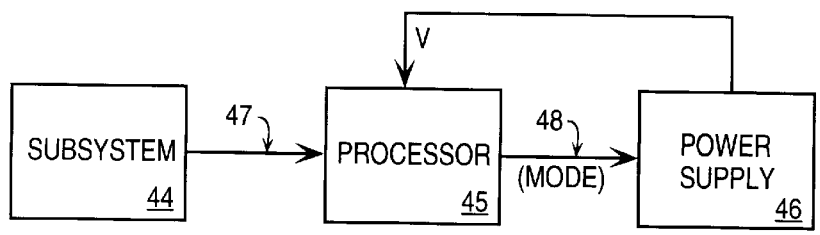
FIG. 4B is a block diagram showing another configuration of a computer system designed in accordance with an embodiment of the present invention.

FIG. 4B is a block diagram showing another configuration of a computer system designed in accordance with an embodiment of the present invention. Subsystem 44 of the computer system sends a signal to processor 45, across signal line 47, that includes information that processor 45 uses to determine whether or not to switch between the sleep and wake modes. As described above, such information might contain, for example, time delays between user inputs, temperature readings of electronic devices within the computer system, or battery power levels. If processor 44 then determines to switch modes, processor 44 sends a mode signal across signal line 48 to power supply 46 before processor 45 switches modes, so that power supply 46 has time to adjust the voltage V supplied to processor 45 in response to the mode signal to compensate for the anticipated voltage transient. For another embodiment of the present invention, a subsystem of a computer system sends a mode signal first to the power supply that supplies voltage to a processor so that the power supply can adjust the voltage to compensate for the anticipated voltage transient, then a mode signal is subsequently sent to the processor in response to which the processor switches modes. For example, a delay generator may be used to send the two separate signals.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for regulating a voltage supplied by a power supply to an integrated circuit comprising:

sending a first signal to the power supply to signify that current drawn by the integrated circuit from the power supply will increase;

raising the voltage supplied by the power supply to the integrated circuit, in response to the first signal, before the current increases, to compensate for an anticipated voltage transient;

sending a second signal to the power supply to signify that current drawn by the integrated circuit from the power supply will decrease; and lowering the voltage supplied by the power supply to the integrated circuit, in response to the second signal, before the current decreases, to compensate for an anticipated voltage transient.

2. The method of claim 1, wherein the steps of sending a signal and raising and lowing the voltage occur in a mobile computer system.

3. The method of claim 1, wherein the integrated circuit is a processor and the current increases and decreases when the processor switches between a sleep mode and wake mode.

4. The method of claim 1, wherein the first and second signals are sent from the integrated circuit.

5. The method of claim 1, wherein the first and second signals are sent from a subsystem within a computer system.

6. A method for regulating a voltage supplied by a power supply to a processor within a computer system comprising:

sending a first signal to the power supply to signify that the processor will switch from a sleep mode to a wake mode;

raising the voltage supplied by the power supply to the processor, in response to the first signal, before the processor switches from the sleep mode to the wake mode, to compensate for an anticipated voltage transient sending a second signal to the power supply to signify that the processor will switch from a wake mode to a sleep mode; and lowering the voltage supplied by the power supply to the processor, in response to the second signal, before the processor switches from the wake mode to the sleep mode, to compensate for an anticipated voltage transient.

7. The method of claim 6, wherein the first and second signals are sent from the processor.

8. The method of claim 6, wherein the first and second signals are received by the processor and cause the processor to subsequently switch between the sleep mode and the wake mode.

9. The method of claim 6, wherein switching from the sleep mode to the wake mode results in an increase in a current drawn by the processor from the power supply.

10. A computer system comprising:

a processor to switch between a sleep mode and a wake mode in response to a first signal;

a transistor having a gate and a source/drain region, the gate to receive the first or a second signal; and a power supply coupled to the source/drain region, of the transistor and supplying a supply voltage to the processor, the power supply to adjust the supply voltage by raising the supply voltage before the processor switches from the sleep mode to the wake mode, and lowering the supply voltage before the processor switches from the wake mode to the sleep mode in response to the first or second signal.

11. The computer system of claim 10 further comprising a resistor in series with the transistor configured to lower an input voltage to the power supply when the transistor is turned on, thereby causing the power supply to raise the supply voltage.

12. The computer system of claim 11, wherein the transistor is an n-channel transistor.

13. The computer system of claim 10, wherein the gate of the transistor receives the first signal and the power supply adjusts the supply voltage responsive to the first signal.

14. The computer system of claim 10, wherein the gate of the transistor receives the second signal generated by the processor in response to the processor receiving the first signal, and the power supply adjusts the supply voltage responsive to the second signal.

* * * * *